United States Patent
Bin

(10) Patent No.: US 10,154,648 B2
(45) Date of Patent: Dec. 18, 2018

(54) PROCESSING EQUIPMENT OF COILED FOLDING PET URINE PAD

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Jiangsu (CN)

( * ) Notice: Subject to any disclaimer, the term of this patent is extended or adjusted under 35 U.S.C. 154(b) by 390 days.

(21) Appl. No.: 14/924,573

(22) Filed: Oct. 27, 2015

(65) Prior Publication Data

US 2016/0113233 A1  Apr. 28, 2016

(30) Foreign Application Priority Data

Oct. 27, 2014  (CN) .......................... 2014 1 0577899

(51) Int. Cl.
*A01K 1/015*  (2006.01)

(52) U.S. Cl.
CPC .................................. *A01K 1/0157* (2013.01)

(58) Field of Classification Search
CPC .............................. A01K 1/0157; B65H 54/00
See application file for complete search history.

(56) References Cited

U.S. PATENT DOCUMENTS

| | | | | |
|---|---|---|---|---|
| 2,971,300 A | * | 2/1961 | Hobbins | A61F 13/15747 242/541.2 |
| 4,471,955 A | * | 9/1984 | Bradley | B65H 29/58 271/203 |

* cited by examiner

*Primary Examiner* — Jeffry H Aftergut
*Assistant Examiner* — Jaeyun Lee
(74) *Attorney, Agent, or Firm* — Osha Liang LLP

(57) ABSTRACT

A coiled folded pet urine pad includes a plurality of pet urine pads, wherein every two adjacent pet urine pads are laminated to each other and sequentially coiled from inside to outside to form a coiled integral body, and a lower half edge of a last single pet urine pad is pressed inside an upper half edge of the next single pet urine pad. A method and equipment for processing a coiled folded pet urine pad that includes multiple single pet urine pads, wherein every two adjacent single pet urine pads are laminated to each other and sequentially coiled from inside to outside to form a coiled integral body, and the lower half edge of the last single pet urine pad is pressed inside the upper half edge of the next single pet urine pad.

2 Claims, 4 Drawing Sheets

PROCESSING EQUIPMENT OF COILED FOLDING PET URINE PAD

CROSS-REFERENCE TO RELATED APPLICATIONS

This application claims priority of Chinese Patent Application No. CN201410577899.3, filed on Oct. 27, 2014, the disclosure of which is incorporated by reference in its entirety.

TECHNICAL FIELD

The present invention relates to a coiled folded pet urine pad as well as a production method and processing equipment thereof.

BACKGROUND ART

With the development of society and growth in the living standard, people also continually pursue spiritual life while enjoying material life, so more and more people yearn for natural ease, and keeping pets has gradually become a kind of popular fashion. In daily life, pet urine pads are generally used by people to clear excrements of pets. However, existing single pet urine pads are connected by breaking-point lines, directly folded and then put into packaging bags for package and use, and thus are convenient to use and occupy a relatively large space since the storage function is not ideal in the use process, and therefore the aesthetic property of the household environment is affected. In order to solve such problems, technical staff of pet product manufacturing enterprises makes improvement on existing pet urine pad processing and production equipment.

SUMMARY OF THE PRESENT INVENTION

The technical solution to be solved by the present invention is to provide a coiled folded pet urine pad.

In order to solve said technical problem, the technical solution adopted by the present invention is as follows: the coiled folded pet urine pad comprises multiple single pet urine pads, wherein every two adjacent single pet urine pads are laminated to each other and sequentially coiled from inside to outside to form a coiled integral body, and the lower half edge of the last single pet urine pad is pressed inside the upper half edge of the next single pet urine pad The technical problem to be solved by the present invention is to provide a production method of the coiled folded pet urine pad, comprising the following steps: conveying the single pet urine pad produced by a pet urine pad processing main machine onto a receiving section at the front end of a lower conveying belt through a conveying device, coiling the former single pet urine pad entering the receiving section by the latter single pet urine pad entering the receiving section, and conveying a laminated pet urine pad to a coiling device for coiling by cooperation of an upper conveying belt and the lower conveying belt.

The technical problem to be solved by the invention is to provide processing equipment of the coiled folded pet urine pad.

In order to solve said technical problem, the technical solution adopted by the present invention is as follows: the processing equipment of the coiled folded pet urine pad comprises a pet urine pad processing main machine frame and a conveying device arranged on the pet urine pad processing main machine frame, wherein an upper conveying belt and a lower conveying belt which are matched to each other are arranged at the rear end of the pet urine pad processing main machine frame, a receiving section is arranged at the front end of the pet urine pad processing main machine frame, a coiling device frame is arranged on the pet urine pad processing main machine frame at the rear end of the upper conveying belt and the rear end of the lower conveying belt, and a coiling device is arranged on the coiling device frame; and the single pet urine pad produced by the pet urine pad processing main machine is conveyed onto the receiving section at the front end of the lower conveying belt through the conveying device, the former single pet urine pad entering the receiving section is coiled by the latter single pet urine pad entering the receiving section, and the laminated pet urine pad is conveyed to the coiling device for coiling by cooperation of the upper conveying belt and the lower conveying belt.

In order to well solve the technical problem, the further technical solution adopted by the invention is as follows: the structure of the coiling device comprises a main shaft arranged in the middle of the coiling device frame, wherein a driven pulley is arranged on one side of the main shaft and is connected with a driving pulley on a drive motor through a driving belt, the drive motor is fixedly arranged on the coiling device frame, and wallboards between which multiple cloth guide rollers are equipped are respectively arranged on two sides of the main shaft; an upper coiling device and a lower coiling device which are identical in structure are arranged on the two wallboards, respectively, wherein the structure of the upper coiling device comprises baffle plates arranged on the inner sides of the two wallboards respectively and mounting bases arranged on the outer sides of the two wallboards respectively, coiling shafts are movably arranged in the baffle plates and the mounting bases, one ends of the coiling shafts are connected with piston rods of telescopic cylinders through connecting rods, and the two telescopic cylinders are fixedly arranged on the outer sides of the two wallboards respectively.

The present invention has the advantages that the coiled folded pet urine pad as well as the production method and processing equipment thereof are high in production efficiency; the produced coiled folded pet urine pad convenient to take is convenient and efficient to use, occupies a small space and is convenient to draw, transport and store since the multiple independent single urine pads are sequentially coiled from inside to outside to form a coiled integral body, and thus beautifies the household environment, keeps the household clean and tidy and alleviates the labor intensity of people.

DETAILED DESCRIPTION

The specific content of the present invention is described in detail below in conjunction with the accompanying drawings and specific embodiments.

Figure 1:
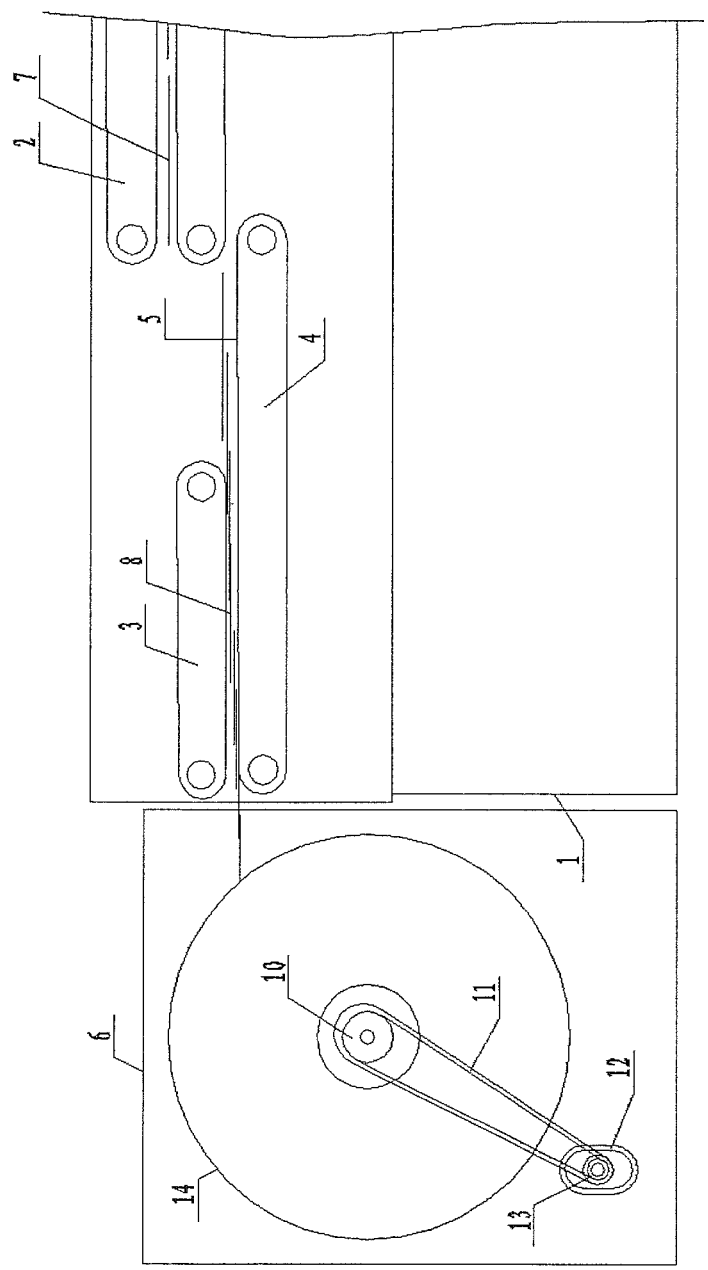
FIG. 1 is a structural schematic diagram of the coiled pet urine pad processing equipment in the coiled folded pet urine pad as well as the production method and processing equipment thereof according to the present invention.
Figure 3:
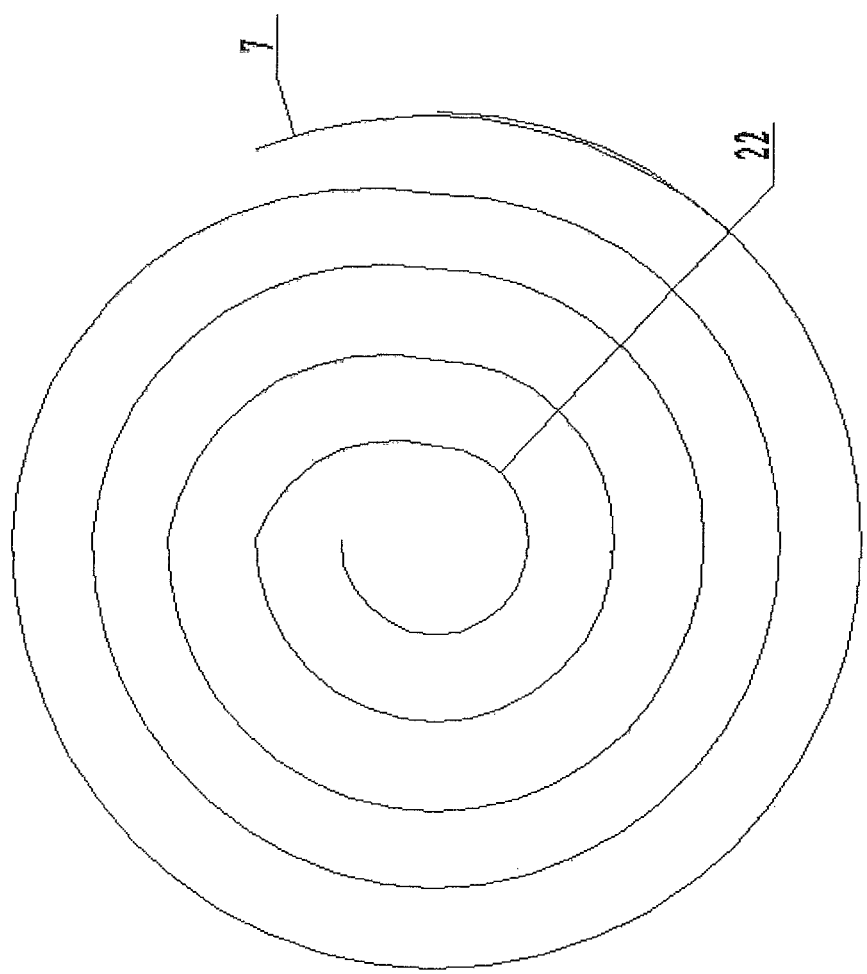
FIG. 3 is a structural schematic diagram of the coiled pet urine pad in the coiled folded pet urine pad as well as the production method and processing equipment thereof according to the present invention.

As can be seen from FIG. 1 and FIG. 3, the coiled folded pet urine pad comprises multiple single pet urine pads 7, wherein every two adjacent single pet urine pads 7 are laminated to each other and sequentially coiled from inside to outside to form a coiled integral body, and the lower half edge of the last single pet urine pad 7 is pressed inside the upper half edge of the next single pet urine pad 7.

As can be seen from FIG. 1, a production method of the coiled folded pet urine pad comprises the following steps: conveying the single pet urine pad 7 produced by the pet urine pad processing main machine onto the receiving section 5 at the front end of the lower conveying belt 4 through the conveying device 2, coiling the former single pet urine pad 7 entering the receiving section 5 by the latter single pet urine pad 7 entering the receiving section 5, and conveying the laminated pet urine pad 8 to the coiling device for coiling by cooperation of the upper conveying belt 3 and the lower conveying belt 4.

Figure 2:
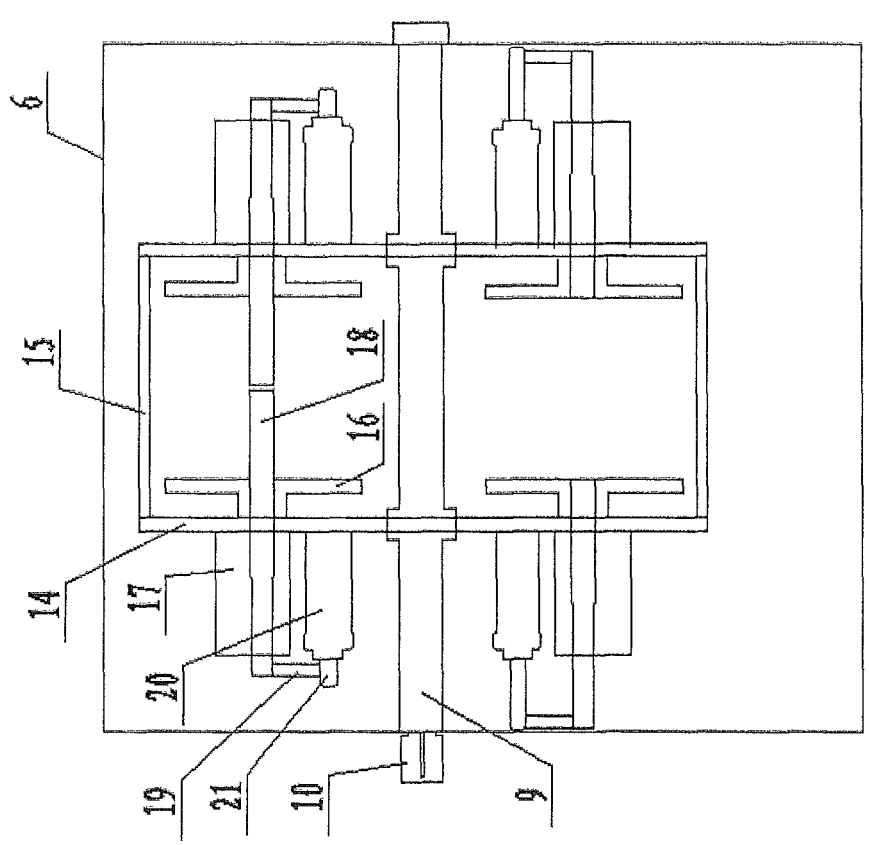
FIG. 2 is a side-view structural schematic diagram of the coiling device in FIG. 1.

As can be seen from FIG. 1 and FIG. 2, the processing equipment of the coiled folded pet urine pad comprises the pet urine pad processing main machine frame 1 and the conveying device 2 arranged on the pet urine pad processing main machine frame 1, wherein the upper conveying belt 3 and the lower conveying belt 4 which are matched to each other are arranged at the rear end of the pet urine pad processing main machine frame 1, the receiving section 5 is arranged at the front end of the pet urine pad processing main machine frame 1, and the coiling device frame 6 on which the coiling device is equipped is arranged on the pet urine pad processing main machine frame 1 on the rear end of the upper conveying belt 3 and the rear end of the lower conveying belt 4; the single pet urine pad 7 produced by the pet urine pad processing main machine is conveyed onto the receiving section 5 at the front end of the lower conveying belt 4 through the conveying device 2, the former single pet urine pad 7 entering the receiving section 5 is coiled by the latter single pet urine pad 7 entering the receiving section 5, and the laminated pet urine pad 8 is conveyed to the coiling device for coiling by cooperation of the upper conveying belt 3 and the lower conveying belt 4.

As can be seen from FIG. 1 and FIG. 2, the structure of the coiling device comprises the main shaft 9 arranged in the middle of the coiling device frame 6, wherein the driven pulley 10 is arranged on one side of the main shaft 9 and is connected with the driving pulley 13 on the drive motor 12 through a conveying belt 11, the drive motor 12 is fixedly arranged on the coiling device frame 6, and the wallboards 14 between which multiple cloth guide rollers 15 are equipped are respectively arranged on two sides of the main shaft 9; the upper coiling device and the lower coiling device which are identical in structure are arranged on the two wallboards 14, respectively, wherein the structure of the upper coiling device comprises baffle plates 16 arranged on the inner sides of the two wallboards 14 respectively and mounting bases 17 arranged on the outer sides of the two wallboards 14 respectively, coiling shafts 18 are movably arranged inside the baffle plates 16 and the mounting bases 17, one ends of coiling shafts 18 are connected with piston rods 21 of telescopic cylinders 20 through connecting rods 19, and the two telescopic cylinders 20 are fixedly arranged on the outer sides of the two wallboards 14 respectively.

As can be seen from FIG. 1 and FIG. 2, according to FIG. 1, when the processing equipment of the coiled folded pet urine pad is used, the single pet urine pad 7 produced by the pet urine pad processing main machine is conveyed onto the receiving section 5 at the front end of the lower conveying belt 4 through the conveying device 2, the former single pet urine pad 7 entering the receiving section 5 is laminated by the latter single pet urine pad 7 entering the receiving section 5, and the laminated pet urine pad 8 is conveyed to the coiling device 6 for coiling by cooperation of the upper conveying belt 3 and the lower conveying belt 4.

As can be seen from FIG. 2, the working principle of the coiling device lies in that: the drive motor 12 drives the driving pulley 13 and the main shaft 9 to rotate through the drive belt 11, the main shaft 9 drives the wallboards 14 and the cloth guide rollers 15 to rotate, the laminated pet urine pad 8 enters the cloth guide rollers 15 and rotates, the telescopic cylinders 20 work to drive the piston rods 21 to stretch out and draw back, and the piston rods 21 drive the coiling shafts 18 to stretch out and draw back through the connecting rods 19; as can be seen from FIG. 2, the two coiling shafts 18 stretch out synchronously, the upper coiling device is at a coiling state, the telescopic cylinders 20 drive the piston rods 21 to draw back after the coiling is ended, the piston rods 21 drive the coiling shafts 18 to draw back through the connecting rods 19, and the coiled pet urine pad 22 as shown in FIG. 3 is taken down by manpower. Then, the two coiling shafts 18 on the lower coiling device stretch out synchronously, and the lower coiling device is at a coiling state. Again and again, thus continuous coiling is realized.

Figure 4:
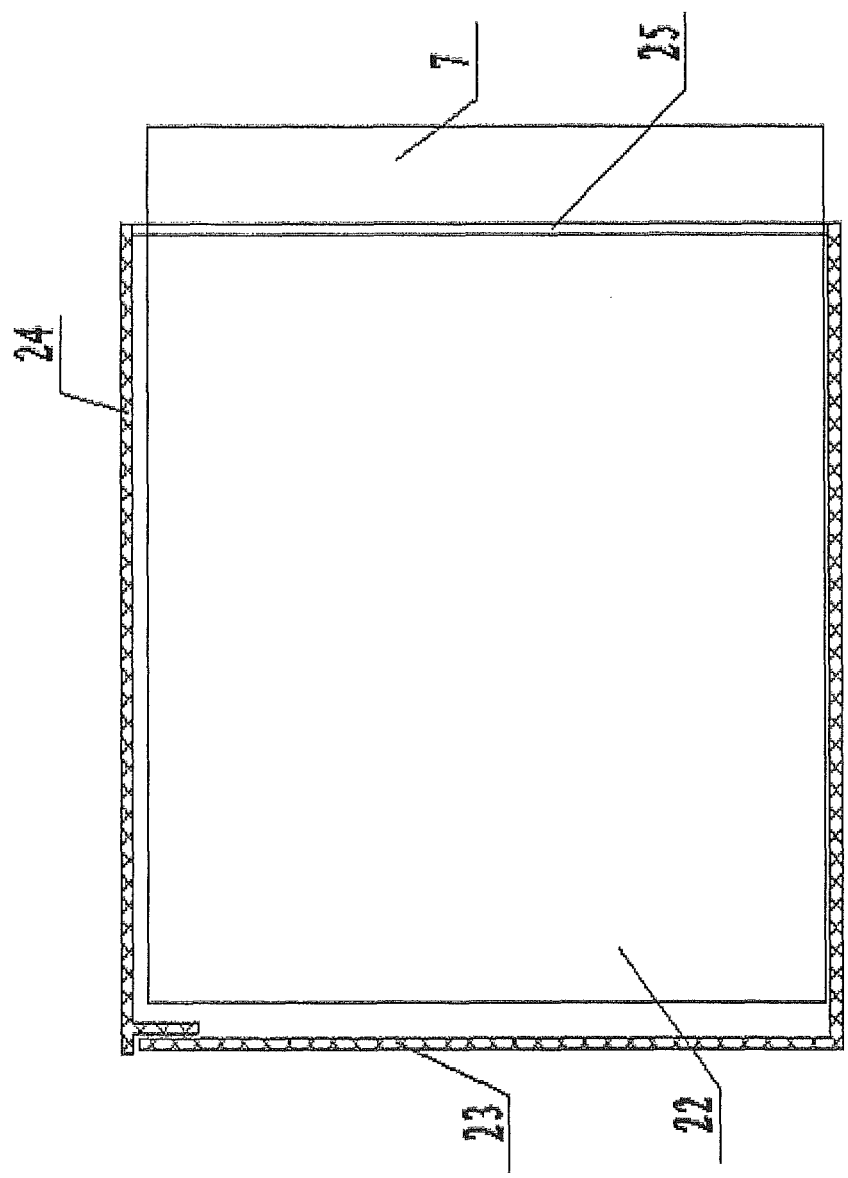
FIG. 4 is a structural schematic diagram when the coiled pet urine pad in the coiled folded pet urine pad as well as the production method and processing equipment thereof is put in a urine pad packaging box according to the present invention In Figs.: the pet urine pad processing main machine frame 1, the conveying device 2, the upper conveying belt 3, the lower conveying belt 4, the receiving section 5, the coiling device frame 6, the single pet urine pad 7, the laminated pet urine pad 8, the main shaft 9, the driven pulley 10, the driving belt 11, the drive motor 12, the driving pulley 13, the wallboard 14, the cloth guide roller 15, the baffle plate 16, the mounting base 17, the coiling shaft 18, the connecting rod 19, the telescopic cylinder 20, the piston rod 21, the coiled pet urine pad 22, the urine pad packaging box 23, the upper cover 24 and the pulling opening 25 are described.

As can be seen from FIG. 3 and FIG. 4, the coiled pet urine pad 22 is put in the urine pad packaging box 23, the upper cover 24 is arranged at the upper end of the urine pad packaging box 23, and the pulling opening 25 from which the single pet urine pad 7 is pulled out is formed in one side of the urine pad packaging box 23.

What is claimed is:

1. A processing equipment for producing a coiled folded pet urine pad according, comprising
   a pet urine pad processing main machine frame; and
   a conveying device arranged on the pet urine pad processing main machine frame,
   wherein an upper conveying belt and a lower conveying belt, which are matched to each other, are arranged at a rear end of the pet urine pad processing main machine frame,
   wherein a receiving section is arranged at a front end of the pet urine pad processing main machine frame,
   wherein a coiling device frame, on which a coiling device is equipped, is arranged on the pet urine pad processing main machine frame on a rear end of the upper conveying belt and a rear end of the lower conveying belt,
   wherein a structure of the coiling device comprises a main shaft arranged in a middle of the coiling device frame, wherein a driven pulley is arranged on one side of the main shaft and is connected with a driving pulley on a drive motor through a driving belt, wherein the drive motor is fixedly arranged on the coiling device frame, and wherein wallboards, between which multiple cloth guide rollers are equipped, are arranged on two sides of the main shaft, respectively, and wherein an upper coiling device and a lower coiling device, which are identical in structure, are arranged on the two wallboards, respectively, wherein a structure of a upper coiling device comprises baffle plates arranged on inner sides of the two wallboards, respectively, and mounting bases arranged on outer sides of the two wallboards, respectively, wherein two coiling shafts are movably arranged inside the baffle plates and the mounting bases, wherein one end of each of the coiling shafts are connected with corresponding piston rods of telescopic cylinders through connecting rods, and the two telescopic cylinders are fixedly arranged on the outer sides of the two wallboards, respectively.

2. A method for producing the coiled folded pet urine pad using the processing equipment of claim 1, comprising:

conveying a single pet urine pad produced by the pet urine pad processing main machine onto the receiving section at a front end of the lower conveying belt through the conveying device, coiling the former single pet urine pad entering the receiving section by a latter single pet urine pad entering the receiving section, and conveying a laminated pet urine pad to the coiling device for coiling by cooperation of the upper conveying belt and the lower conveying belt wherein the conveying of the laminated pet ring pad further comprises:

driving the driving pulley with the drive motor and rotating the main shaft through the drive belt, and driving the two wallboards with the main shaft and rotating the cloth guide rollers, entering the laminated pet ring pad in the cloth guide rollers and rotates, working the telescopic cylinders to drive the piston rods to stretch out and draw back, and driving the coiling shafts to stretch out and draw back through the connecting rods with the piston rods, stretching out the coiling shafts on the upper coiling device synchronously, the upper coiling device is at a coiling state, driving the piston rods to draw back after the coiling is ended with the telescopic cylinders, driving the coiling shafts to draw back through the connecting rods with the piston rods, and stretching out the coiling shafts on the lower coiling device synchronously, the lower coiling device is at a coiling state.

* * * * *